United States Patent [19]

Reed

[11] 3,815,698

[45] June 11, 1974

[54] HYDROMECHANICAL STEERING TRANSMISSION

[75] Inventor: Bradley O. Reed, Pittsfield, Mass.

[73] Assignee: General Electric Company

[22] Filed: Apr. 20, 1972

[21] Appl. No.: 245,961

[52] U.S. Cl. .............................. 180/6.48, 74/720.5
[51] Int. Cl. ............................................. B62d 11/04
[58] Field of Search .......... 180/6.48, 6.44; 74/720.5

[56] References Cited
UNITED STATES PATENTS

| | | | |
|---|---|---|---|
| 3,199,376 | 8/1965 | De Lalio | 74/720.5 |
| 3,368,425 | 2/1968 | Lewis | 74/720.5 |
| 3,590,658 | 7/1971 | Tuck | 74/720.5 |
| 3,596,535 | 8/1971 | Polak | 74/720.5 |
| 3,650,129 | 3/1972 | Cockrell | 74/720.5 |

*Primary Examiner*—David Schonberg
*Assistant Examiner*—John A. Pekar
*Attorney, Agent, or Firm*—Francis K. Richwine; Joseph B. Forman

[57] ABSTRACT

The invention provides a hydromechanical drive and steering transmission wherein power applied to the input of the transmission is utilized for hydraulic drive and steer in forward and reverse of a first range, and combined hydraulic drive and mechanical drive are utilized in a second higher range, wherein steer remains a function of the hydraulic portion of the transmission. Contribution of the hydraulic portion of the transmission to output in second range is effected through a planetary steer differential coupled to a first and second hydraulic motor unit of the hydraulic portion of the transmission. The disclosure also includes the application of an optional hydromechanical third range.

12 Claims, 5 Drawing Figures

PATENTED JUN 11 1974    3,815,698

HYDROMECHANICAL STEERING TRANSMISSION

BACKGROUND OF THE INVENTION

This invention relates to an improved hydromechanical drive and steering transmission for vehicles utilizing continuous treads or tracks as means for propelling a vehicle, and more particularly to such transmission wherein both propulsion and steering ratios are infinitely variable to meet the particular vehicular movement requirements. The invention was first actually reduced to practice under a contract with the Department of Army.

In prior art transmissions for use with vehicles of the type herein contemplated wherein clutch arrangements are utilized in the steer path, difficulty in steer has been encountered. In the present invention, the use of a clutch in the steer path of the transmission is not required.

Furthermore, it has been found that in some prior art steer or steering transmissions, steer direction has been adversely effected when moving from one gear range to another. It has heretofore been necessary in such transmissions to reverse the direction of steer at each change from one gear range to another. In the present invention, it is unnecessary to reverse the direction of steer when one moves from one gear range to another.

In vehicles of the type utilizing the invention, it is most desirable to effect mobility of the highest order, and the transmission contemplated for use therein must provide for the obtaining of infinitely variable speeds to the treads or tracks when the vehicle is moving straightaway as well as infinitely variable and differentially applied speeds to the treads or tracks when the vehicle is engaged in a turning operation. To accomplish the desired steering mobility under continuous power application from a driving power source, the invention contemplates the use of hydraulic elements in lieu of gear-ratio changes accomplished by an operator's manipulation of a gear shift lever.

It is an object of the invention to provide an improved steering transmission for use with track or tread vehicles utilizing a difference of speed between the track or tread on one side and the track or tread on the other side to effect the steering operation.

It is a further object of the invention to provide an improved steering transmission for use with track or tread vehicles whereby the same difference in output speed, between the track or tread on one side respective the track or tread on the other side, is retained, for a given difference in hydraulic motor speed, regardless of the range of operation of the transmission.

It is another object of the invention to provide an improved steering transmission for use with track or tread vehicles, which transmission utilizes a reduced number of parts or components such as gears and is therefore lighter in weight and occupies less space than a typical present day steering transmission.

SUMMARY OF THE INVENTION

In carrying out my invention as it relates to the steering of a vehicle by selectively varying the speed of output shafts supplying power to the treads or tracks on each side of the vehicle, I have found a transmission, incorporating the combination of a hydraulic and mechanical drive combined with the novel gearing arrangement, hereinafter described in detail, to be extremely advantageous.

The transmission provides hydraulic drive means through planetary gearing to each output shaft from the motor portion of a pump-motor unit associated with the shaft. The outputs of the two pump-motor units are coupled to each other through a planetary steer differential. The pump-motor units are powered from the source of drive power, which is an engine or prime mover, coupled to the input of the transmission. The source of drive power additionally provides power to the mechanical drive portion of the transmission. It is essential for propelling the vehicle, in which the transmission of my invention is utilized, so that it travels in a straight line, that the pump portion of each hydraulic unit have the same displacement to run its motor portion at substantially the same speed. Turning of the vehicle is effected by changing the displacement of one pump portion respective the other to obtain a differential in speed between the two motor portions associated therewith. The manner for effecting change of the displacement of the pump in each pump motor unit is well known in the art and is not further discussed herein.

Mechanical drive means is provided through appropriate gearing between the input of the transmission and the planetary gearing forming the coupling between the hydraulic drive means and the output shafts.

BRIEF DESCRIPTION OF THE DRAWING

Other objects and advantages of the invention will become obvious to those skilled in the art from a reading of the specification when taken with the drawings; wherein.

DETAILED DESCRIPTION OF A PREFERRED EMBODIMENT

Figure 1:
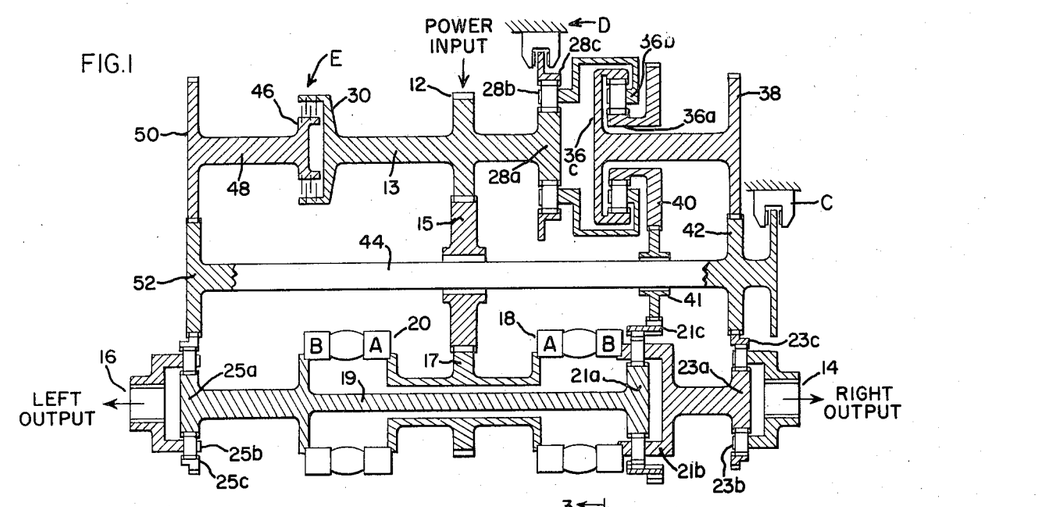
FIG. 1 is a diagrammatic view of a transmission incorporating the invention.

Referring to the drawings, and more particularly to FIG. 1, wherein a transmission of the hydromechanical type contemplating three ranges and incorporating the invention is shown, the reference numeral 12 designates a power input gear which may be coupled by suitable well-known means to a prime mover such as an engine or motor or the like (not shown for purposes of clarity). Power applied to input gear 12 fixedly mounted on shaft 13 is transmitted through transfer gear 15 to hydraulic pump and motor units 18 and 20 via gear 17. Power is applied hydraulically to right and left output shafts 14 and 16 through output planet gear sets 23 and 25 which are coupled to hydraulic pump and motor units 18 and 20 respectively through sun gears 23a and 25a. In lieu of a bevel gear differential, my invention utilizes a planetary steer differential 21; having a ring gear 21c, and planetary carrier 21b and sun gear 21a. The output from pump motor unit 18 is coupled to planetary carrier 21b of steering differential 21, which in turn drives sun gear 23a. The output from pump motor unit 20 is coupled to sun gear 21a of steer differential 21 through shaft 19 and to sun gear 25a as heretofore indicated.

With further reference to FIG. 1, mechanical power is transmitted from transmission input 12 to a second range sun gear 28a and a third range clutch element 30, both of which are secured to a common rotatable shaft 13. In the second range of operation of the transmission, power is transferable from sun gear 28a through a second range planetary carrier 28b to another planetary carrier 36b. Planetary gear set 36 is a reversing gear set.

The ring gear 28c of planet set 28 is freely rotatable but is subject to arrest by a brake D. Sun gear 36a of planet set 36 is coupled to transfer gear 40. The ring gear 36c of planet set 36 is coupled to transfer gear 38.

Transfer gear 38 is in engagement with a transfer gear 42 securely mounted on rotatable cross shaft 44, with gear 42 engaging the ring gear 23c of output planet set 23. Transfer gear 40 is coupled to ring gear 21c of planetary steer differential 21 through idler gear 41.

Clutch element 30 is associated with a second clutch element 46, both elements being designated as E, and which clutch element 46 is mounted on a shaft 48. A transfer gear 50 is also mounted on shaft 48 and is in engagement with a transfer gear 52 securely mounted on cross shaft 44. Transfer gear 52 drives ring gear 25c of output planet gear set 25.

Cross shaft 44 is subject to restraint through activation of a brake element C and thus provides for locking ring gears 23c and 25c against rotation, providing for the transfer of power from sun gears 23a and 25a to planetary carriers 23b and 25b respectively in the first range of operation of the transmission. The brake elements C and D may also be referred to as clutch devices.

Prior to explaining the operation of the transmission, a better understanding of the structure of the illustrative hydraulic system pump-motor units 18 and 20, which are substantially similar, and the several planetary gear sets referred to herein may be helpful.

Figure 2:
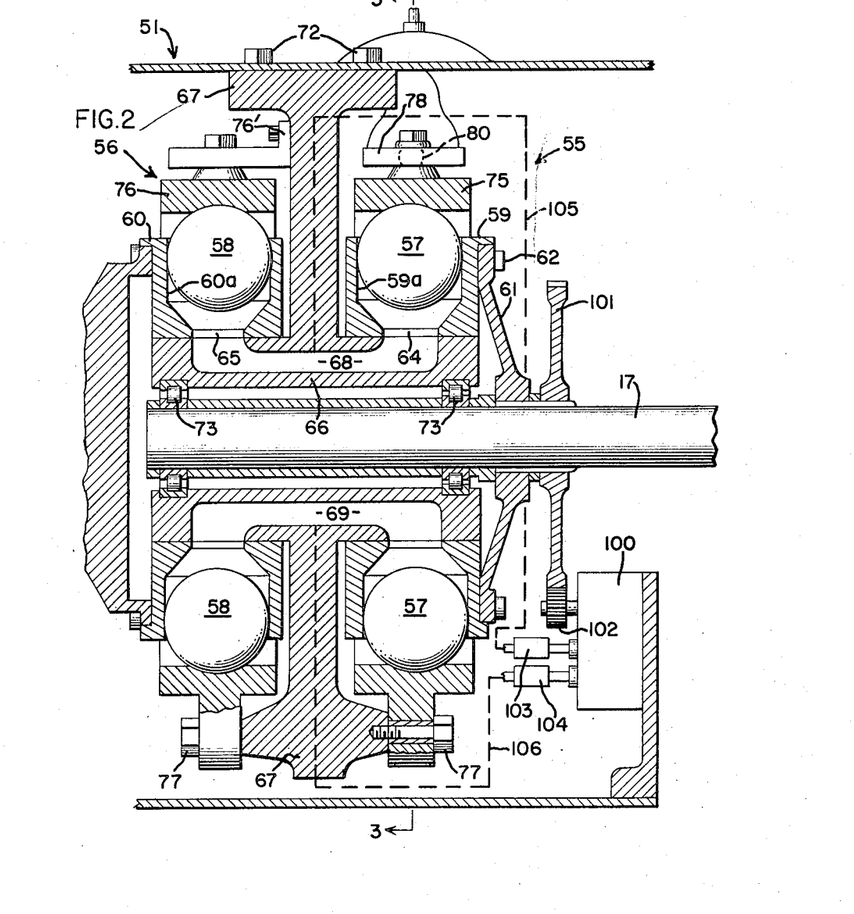
FIG. 2 is a cross-sectional view of a pump-motor unit for use with the present invention.
Figure 3:
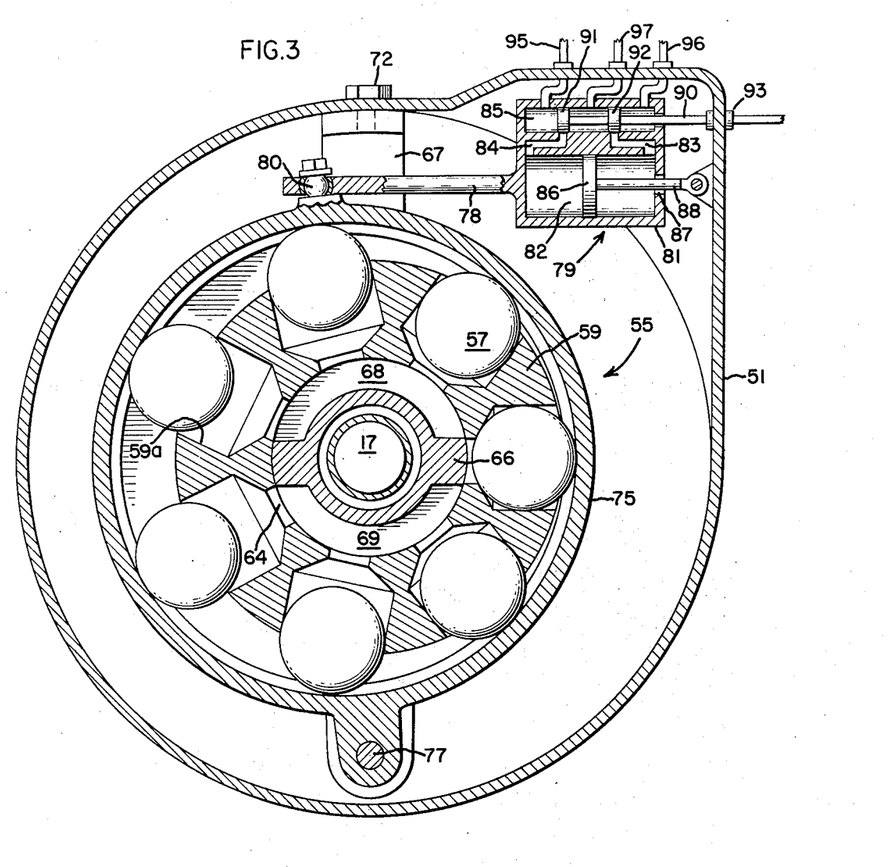
FIG. 3 is a cross sectional view along the lines 3—3 of FIG. 2 showing a variable pump unit which may be utilized in the hydraulic drive means of a transmission incorporating the invention.

Referring to FIGS. 2 and 3, the hydraulic system comprising a variable displacement pump unit 55 and a motor unit 56, the pump unit 55 being further illustrated by FIG. 3. While these units are nominally referred to as being pump and motor units, it should be understood that under certain conditions the functions of the units may be reversed; that is, the motor may act as a pump for supplying power to drive the pump, which will then be acting as a motor. (For this reason it is occasionally appropriate to refer to the two portions as A and B blocks as indicated in FIG. 1.) In this respect, the hydraulic system and the units comprising the system may be said to be reversible since the functions of the individual hydraulic units and the hydraulic system as a whole are in fact reversible. The units 55 and 56 each include a row of ball pistons 57 and 58, respectively, which may freely reciprocate within cylinder blocks 59 and 60. The pump cylinder block 59 is connected by a flange 61 to transfer gear 17 for rotation therewith at all times at a speed directly proportional to the speed of the prime mover. The flange 61 may be attached to the cylinder block 59 by any suitable means such as bolt fasteners 62; similarly, the cylinder block 60 is connected to planetary carrier 21b of planetary gear differential 21 and to sun gear 23a when referenced to pump motor unit 18, and to sun gears 21a and 25a when referenced to pump motor unit 20. The ball pistons 57 and 58 reciprocate within cylinders 59a and 60a, formed in the cylinder blocks 59 and 60, respectively. As small a clearance as possible is provided between the ball pistons and the cylinders in order to permit free movement of the ball pistons with minimum leakage. Fluid passages 64 and 65 connecting with the cylinders are provided, these passages opening radially inward from the cylinder blocks. As illustrated in FIGS. 2 and 3, the cylinder blocks are rotated about a stationary pintle 66 in which is formed two axially extending fluid passages 68 and 69 which extend partially around the pintle.

Pintle 66 is supported by a pintle support member 67 extending from the housing sidewall 51 and secured thereto by bolt fasteners 72. The pintle and pintle support member also support the transfer gear 17 for rotation on roller bearings 73 located between the shaft and pintle. A pump race 75 is pivotally supported from the pintle support member 67 by the bolt 77 with the diametrically opposite side of the race 75 supported by a positioning member or actuating arm 78 extending between the race and a race positioning actuator 79 connected to the race through a ball joint 80. The position of race 75 may be varied with respect to the cylinder block 59 in a manner well known in the art. Motor race 76 in this embodiment is fixedly supported and eccentrically positioned with respect to the cylinder block 60 by the support member 76' and the bolt 77 extending between the race and pintle support 67.

As illustrated in FIG. 3, the race positioning actuator 79 includes a housing 81 with an internal cylindrical cavity 82 having fluid ports 83 and 84 connecting each respective end of the cavity 82 to another hydraulic control cavity 85. A piston 86 is located for reciprocal movement in the cavity 82 with the positioning rod or member 88 extending through an opening 87 in the housing 81 and having its end pivotally secured to transmission sidewall 51. A stroking rod 90 extends through the opening 93 in the housing 51 and into the control cavity 85 with spaced pistons 91 and 92 attached thereto for reciprocal movement within the cavity 85. Fluid outlets 95 and 96 lead to the control cavity 85 with an inlet 97 situated between these outlets. By providing pressured fluid to the inlet 97 and by suitably positioning the stroking rod 90, the fluid introduced into the cavity 85 between spaced pistons 91 and 92 through inlet 97 will enter either of the inlet passage 83 or 84 to flow into the cavity 82 and thereafter force the race positioning actuator housing 81 to move longitudinally relative to piston 86. This movement of the actuator housing 81 moves the actuating arm 78 to pivot the race 75 about the bolt member 77 into an eccentric position with respect to the cylinder block 59.

With reference now to FIG. 2, any hydraulic fluid escaping from the hydraulic system flows to the bottom of the housing to serve both to lubricate the moving parts of the transmission and to act as a reservoir to a pump 100 for replenishing the hydraulic fluid within the hydraulic system. The pump 100 is driven by a gear 102 meshing with gear 101 on a shaft associated with gear 17. Check valves 103 and 104 are provided in the respective hydraulic lines 105 and 106 (illustrated as dotted lines) leading to the passages 68 and 69. In this manner, any required fluid replacement within the hydraulic system may be supplied to the low pressure passage of the pintle 66.

The operation of the hydraulic system will now be described. Turning to FIG. 3 and referring to the position around the race 75 as numbers on a clock, it will be noted that as the cylinder block 59 rotates, the balls 57 are forced outwardly by centrifugal force against the inner surface of the race 75. It should further be noted that as the balls ride along the inner surface of the race 75, the eccentricity of the race with respect to the cylinder block forces the balls to reciprocate within the cylinders 59a. If low pressure hydraulic fluid is introduced into the passage 69 in the pintle and the cylinder block is rotated in a clockwise direction, as the balls progress from the three o'clock position to the nine o'clock position, the cylinders 59a will be filled with the low pressure hydraulic fluid due both to the movement of the balls outwardly in these cylinders creating a low pressure region in the cylinder and also to the pressure of the hydraulic fluid in the passage 69 forcing flow into the cylinders. As the cylinders 59a pass the nine o' clock position, the fluid passageways 64 interconnect the cylinders 59a and the pintle passage 68. With the cylinders now proceeding from the 9 o'clock position to the 3 o'clock position the ball pistons 57 are forced inwardly into the cylinders 59a thereafter forcing fluid out of the cylinders through the ports 64 into the passage 68 at high pressure until the cylinders reach the 3 o'clock position; thereafter this cycle is repeated every revolution of the cylinder block. By controlling the amount of eccentricity of the ball pump race 75 with respect to the cylinder block, the total amount of fluid pumped by or the capacity of the ball pump during one revolution may be regulated. A simple modification of the structure would permit movement of race 76 to vary the eccentricity of motor unit 56 if desired.

If the above-described fluid flow is reversed, that is, if pressured fluid is forced into such a hydraulic unit causing the ball pistons to move outward due to the pressure created by the fluid, a reaction will be effected between the balls and the eccentric race to cause relative rotation between the cylinder block and the race. Therefore, with the motor unit 56 connected to the pintle passages 68 and 69, the pump unit 55 may be utilized to drive this motor unit and in this manner a continuously variable speed range may be provided between the pump unit 55 and the motor unit 56 by varying the eccentricity of the pump unit 55. If the pump unit 55 and the motor unit 56 have the same capacity, their rotational speed will be the same. With the race 76 of the motor unit 56 fixed, it will be seen that the speed of the motor unit is controlled by the eccentricity of the race 75. If the capacity of the pump unit 55 is greater than that of the motor unit 56, the motor unit 56 must rotate faster than the pump unit 55 to handle the same amount of fluid. Further, by reversing the eccentricity of the pump unit, the motor unit may be driven in a reverse direction. It will be noted at this point that the pintle passages 68 and 69 form a closed hydraulic circuit interconnecting the pump unit 55 and the motor unit 56. The entire flow of hydraulic fluid pumped by the pump unit 55 is utilized in driving the motor unit 56.

Figure 4:
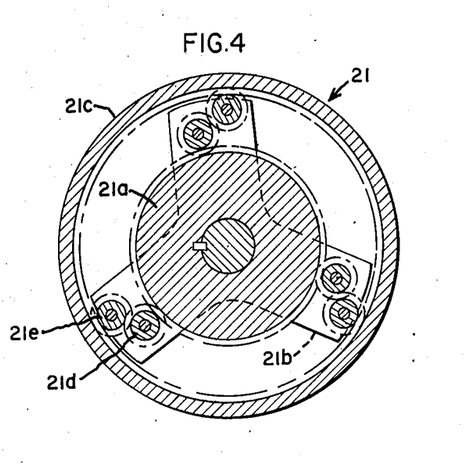
FIG. 4 is a plan view of a steering planetary gearing arrangement utilized with the invention.

Referring to FIG. 4, wherein a section is taken through steer differential 21, the outer ring gear is designated by the reference numeral 21c and the sun gear is designated by the reference numeral 21a. The planet carrier 21b is formed with pinion gears 21d which are free to rotate about their own axis. It is to be noted that the sun gear 21a meshes with an inner set of pinion gears 21d, each of which in turn meshes with one of an outer set of pinion gears 21e and each of the outer set of pinion gears 21e also mesh with ring gear 21c. With the fore-going arrangement and a suitable choice of gear diameters, which may be readily ascertained by one skilled in the art, a planetary gear set is obtained wherein the ring gear provides an output speed averaging the speed of rotation of the sun gear and the planetary carrier.

Figure 5:
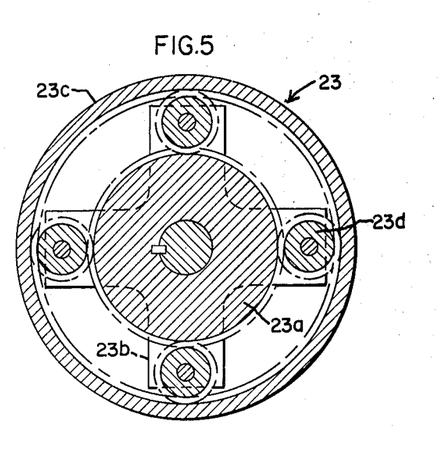
FIG. 5 is a plan view of another planetary gearing arrangement utilized with the invention.

FIG. 5 is illustrative of a type of planet gear set as utilized for gear sets 23 and 25 as well as planetary gear sets 28 and 36. With reference to gear set 23, the outer ring gear is referenced by the numeral 23c, the planetary carrier by the reference numeral 23b and the sun gear by the reference numeral 23a. The operation of this type of planet set is well known in the art.

STEERING OPERATION

To effect steering, and referring more particularly to FIG. 1, the pump motor units 18 and 20 are utilized for providing the steering power as well as contributing to the driving speed and power. Once the prime mover associated with the transmission is operating and supplying input power to input gear 12, power is transferred through gears 15 and 17 to the inputs 18A and 20A of pump and motor units 18 and 20 causing the pump cylinder blocks associated with pump units 18A and 20A to rotate. However, with the stroking of race positioning actuators 79, which are associated with corresponding pump units 18A and 20A positioned at zero stroke, that is, with no oil being delivered by the pumps, the motor units 18B and 20B associated with corresponding pump units 18A and 20A are not powered or rotated and no power is transmitted to the transmission output shafts 14 and 16.

Stroking of the race position actuators of both 18A and 20A to a uniform degree of eccentricity will cause the B blocks to rotate either forward or backwards depending on the direction of the stroke and cause the vehicle to move accordingly. When the operator of the vehicle in which the transmission is operative desires to turn the vehicle in a particular direction, he simply turns the vehicle's steering wheel in the direction he desires to go, generating a signal which is transmitted to the race position actuators 79 of pump units 18A and 20A by any of several control mechanisms well known in the art. The control mechanisms are not shown in the drawings for the sake of clarity. As the pump races 75 of pump units 18A and 20A are positioned eccentrically with respect to their corresponding cylinder blocks in a ratio determined by the desired steer effect, oil is simultaneously delivered to the motor units 18B and 20B responsive to that ratio to effect a steer.

Since the steering operation of a track laying vehicle is effected by a different in track speeds, e.g., driving one track slower than the other track, depending on the direction of steer, one of the pump races may be positioned in a manner to impart forward motion to the corresponding output shaft associated therewith, while the other pump race is positioned in a manner to either impart backward motion (in the case of a stationary vehicle) or lessen the forward motion of the corresponding output shaft associated therewith (in the case of a vehicle already moving forward). This operation is commonly knwon as stroking the pump unit (either forward or backwards) and results in the desired steer effect. Since there are no brakes or clutches in the steer path, steering is not affected by degraded performance or failure of brakes or clutches.

REVERSE AND FIRST RANGE FORWARD OPERATION

To drive the output shafts 14 and 16 in the first range of operation, and more particularly in a first direction, brake or clutch device C is engaged, brake or clutch D is disengaged and clutch E is disengaged. Pump units 18A and 20A are stroked to provide oil to motor units 18B and 20B causing said motor units to rotate sun gears 23a and 25a. With ring gears 23c and 25c restrained from movement by brake C and gears 42 and 52 respectively, the rotation of sun gears 23a and 25a imparts rotation to planet carriers 23b and 25b which planet carriers are securely fastened to output shafts 14 and 16. By stroking pump units 18A and 20A to the same degree and with motor units 18B and 20B substantially similar, the output shafts 14 and 16 rotate at the same rate of speed and when properly connected to a driving means of a vehicle, propel the vehicle in a straight line.

To drive the output shafts 14 and 16 in the first range of operation, but more particularly in the reverse of said first direction, brake C is again engaged, brake D and clutch E are disengaged in the same way as before. Pump units 18A and 20A, however, are stroked in the opposite direction from that indicated above and result in the opposite rotation of sun gears 23a and 25a to impart reverse motion to output shafts 14 and 16.

SECOND RANGE OPERATION

The operation of the transmission of the invention in the transfer of first range operation forward to second range operation is effected smoothly from the first range by stroking the pumps 18A and 20A to + 80 percent of maximum stroke at which time the transfer of range is effected. During operation of the transmission in the first range of operation, motion of idler gear 41, gear 40, sun gear 36a, planet carrier 36b, and planet carrier 28b is effected through the interconnection of idler gear 41 to ring gear 21c, without transfer of propulsion power to the output shafts 14 and 16. At the same time, sun gear 28a is rotating by virtue of its connection to input gear 12. As the + 80 percent stroke is approached by pumps 18A and 20A and through proper choice of gear ratios, the interaction of sun gear 28a and planet carrier 28b cause a slow down of rotation of ring gear 28c, and bring the rotation of ring gear 28c to a halt at substantially the + 80 percent point of the stroke. To the point of + 80 percent of the stroke of pumps 18A and 20A in the first range, no transfer of mechanical drive action has been applied to output shafts 14 and 16 since gear 42 has been locked against rotation by brake C. However, at the + 80 percent of stroke point, brake D is actuated, by means well known in the art, and brake C is released (releasing gear 42), causing a synchronous transition of operating range from first range to second range. The transition in range is accomplished with no interruption in power flow to output shafts 14 and 16 and without substantial change in either input speed or the transmission output shaft speed.

Further operation in the second range is effected by the reduction in stroke of pumps 18A and 20A, which reduces the hydraulic drive contribution to the sun gears 23a (which continue to rotate, contribute to the ultimate rate of rotation of, and to provide the steering contribution to the output shafts, 14, 16), while transferring the same to ring gears 23c and 25c and planet carrier sets 23b and 25b and thus output shafts 14 and 16. The latter transfer is effected to the outputs via ring gear 21c, idler gear 41, gear 40, sun gear 36a, planet carrier 36b, ring gear 36c, transfer gear 38, transfer gears 42 and 52, and via ring gear 23c to planet carrier 23b and output shaft 14, and via ring gear 25c to planet carrier 25b and output shaft 16. At the same time, mechanical propulsion power is transferred to the output shafts 14 and 16 via shaft 13, sun gear 28a, planet carrier 28b, planet carrier 36b, ring gear 36c to combine with the aforementioned hydraulic power drive contribution. The further stroking of the pumps causing a slowing of motors 18B and 20B to a stop and the subsequent reversing of their rotation further increases the rotational speed of the output shafts.

Steer is obtained by effecting a speed differential between sun gears 23a and 25a as a result of the uneven stroking of the A blocks causing one B block to run faster than the other. Even though the stroking taking place in second range is negative, i.e., from + 80 percent at the first/second range shift to − 80 percent at the second/third range shift point, steer remains positive unlike many prior art synchronous shift systems in which steer is negative (or reversed) in any range in which speed is increased by stroking negatively. During a steer, ring gear 21c of planetary steer gear set 21, averages the speed of motors 18B and 20B and transmits this average to sun gear 36a which in turn transmits the effect to transfer gear 38 and on to ring gears 23c and 25c. Since the second range speed is partly a function of hydraulic output from the B blocks introduced through the reversing gears 36 as an average of the two B block speeds, the second range speed contribution of ring gears 23c and 25c is unaffected by steer which is accomplished entirely by the contribution of the sun gears 23a and 25a. Not only does use of the average speed maintain a uniform net vehicle speed in turns, an improvement over the prior art, but it permits the use of a single reversing gear set which in turn provides the positive steer feature. In turn, and most importantly, since steer is entirely a function of the first range apparatus, the hydraulic pressure to torque ratio for steering remains that of the first range gearing permitting the propulsion pressure to torque ratio of second range to be increased to extend second range speed output without loss of steering effectiveness or overloading the hydraulic system in second range operation.

THIRD RANGE OPERATION

In transferring from second range operation to third range operation, the pump motor units 18 and 20 are stroked at − 80 percent, at which time the gear 50, shaft 48, and clutch element 46 are rotating at the same speed as input shaft 13 and clutch element 30. Brake D is disengaged and clutch E is engaged to drive transfer gears 50 and 52 and transfer gear 42 by means of cross shaft 44 and to the ring gears 23c and 25c of output planet gear sets 23 and 25 respectively. This shift is also effected without interruption in power flow to output shafts 14 and 16 and without substantial change in either input speed or transmission output shaft speed. Speed in the third range is increased by slowing the rotation of motors 18b and 20b and going through zero rotation to + 100 percent stroke of pump units 18a and 20a which drives the shafts 14 and 16 to maximum rotational speed.

Having thus disclosed an improved transmission of the hydromechanical type incorporating the invention, it is obvious that, if desired, a two-speed range or other range of operations, as well as variations in the gearing may be achieved without departing from the spirit of the invention. Further, the first range could be made as a hydromechanical range by the insertion of gearing such as additional planetary gearing between the output of the B blocks and the inputs 21a and 21b of the planetary steer differential. Although ball piston pump motor units 18 and 20 have been described herein, it is to be understood that their description is illustrative, and any suitable type of variable ratio means, known in the art, could be substituted in place of the ones herein described.

Furthermore, although reference has been made herein to tread or track type vehicles, the transmission may be utilized with wheel type propelled vehicles. It is therefore desired that the appended claims be interpreted within the spirit and scope of the invention disclosed herein.

What is claimed as new and desired to be secured by Letters Patent of the United States is:

1. A hydromechanical drive and steer transmission having an input, a first output and a second output, and means for coupling said input to said outputs including:

a. hydraulic drive means;
      said hydraulic drive means including a first hydraulic motor and a second hydraulic motor, means coupling said motors to said input, and means for selectively varying the rotational output speed of each said hydraulic motor;
      means coupling said first motor to said first output;
      means coupling said second motor to said second output;
      a steering differential including a first input, a second input and an output;
      means coupling said first hydraulic motor to said first input of said steering differential;
      means coupling said second hydraulic motor to said second input of said steering differential;
      said output of said steering differential providing an average output of said first and second inputs;

b. mechanical drive means coupled to said input and including:
      selective means for selectively coupling said mechanical drive means to said first output and said second output; and
      selective means for selectively coupling said output of said steering differential to said mechanical drive means;
      whereby selective actuation of said selective means in different modes causes said transmission to drive in distinct ranges.

2. A hydromechanical transmission as defined in claim 1 and wherein said first hydraulic motor and said second hydraulic motor are ball piston pump-motor units.

3. A hydromechanical trasmission as defined in claim 1, and wherein said steering differential is a planetary set wherein said first input comprises a planetary carrier, said second input is a sun gear and said output is a ring gear.

4. A hydromechanical transmission as defined in claim 1 wherein said selective means for selectively coupling said mechanical drive means to said first and second outputs includes a plurality of clutch devices whereby actuation of said devices in a first mode causes said transmission to drive solely through said hydraulic drive means in a hydrostatic range, actuation of said devices in a second mode actuates said means for selectively coupling said output of said steering differential and causes said transmission to drive through both said hydraulic drive means and said mechanical drive means in a hydromechanical range, and actuation of said devices in a third mode causes said transmission to operate in a different hydromechanical range.

5. A hydromechanical drive and steer transmission having an input, a first output shaft and a second output shaft, and means for coupling said input to said output shafts including:

a. hydraulic drive means coupled to said input including:
      a first hydraulic motor, a second hydraulic motor and means for selectively varying the rotational output speed of each said hydraulic motor;
      means coupling said first motor to said first output shaft, said means including a first planet gear set having a sun gear, a planetary carrier and a ring gear, said first motor being coupled to said sun gear and said output shaft being coupled to said planetary carrier;
      means coupling said second motor to said second output shaft, said means including a second planet gear set having a sun gear, a planetary carrier and a ring gear, said motor being coupled to said sun gear and said output being coupled to said planetary carrier;
      a steering differential including a first input, a second input and an output;
      means coupling said first hydraulic motor to said first input of said steering differential;
      means coupling said second hydraulic motor to said second input of said steering differential;
      said output of said steering differential providing an average output of said first and second inputs;

b. mechanical drive means coupled to said input and including:
      a clutch for selectively coupling said output of said steering differential to said mechanical drive means; and
      plural selective clutch means for coupling said mechanical drive means to said ring gear of said first planet gear set and said ring gear of said second planet gear set;
      whereby activation of said plural selective clutch means in one mode causes said transmission to drive through said hydraulic means in a hydrostatic first range, activation in a second mode engages said clutch and causes said transmission to drive through both said hydraulic means and said mechanical means in a hydromechanical second range.

6. A hydromechanical transmission as defined in claim 5 and wherein said first hydraulic motor and said second hydraulic motor are ball piston pump-motor units.

7. A hydromechanical transmission as defined in claim 5 and wherein said steering differential is a planetary gear set wherein said first input comprises a planetary carrier, said second input is a sun gear and said output is a ring gear of said gear set.

8. A hydromechanical transmission as defined in claim 6 wherein said plural clutch means for selectively coupling said mechanical drive means to said ring gears of said first and second planet gears includes means for coupling said mechanical drive means to said ring gears in a third mode to provide an additional hydromechanical range.

9. In a multirange hydromechanical steering transmission, the improvement comprising a differential device responsive to two independent speed outputs of a steering range mechanism, said differential device interconnecting said steering range mechanism and the mechanism of an other range to introduce the average speed of said outputs as one of a plurality of inputs to said other range mechanism whereby steering is accomplished solely through said steering range mechanism.

10. The improvement is a multirange hydromechanical steering transmission of claim 9 wherein said differential is a mechanical differential, and said other range is a higher range than said one range and said average speed is introduced into said second, higher range through a single gear set in said second, higher range mechanism.

11. The improvement in a multirange hydromechanical steering transmission of claim 10 wherein said first range mechanism includes right and left hydraulic components having variable hydraulic displacement and said second range is a hydromechanical range.

12. In a multirange hydromechanical steering transmission having power input means; a hydrostatic first range including mechanical input drive means responsive to said power input means, adjustable hydraulic propulsive and steering means responsive to said drive means, two output shaft means responsive to said propulsive and steering means, the speed of each said output shaft means being independently adjustable by said adjustable propulsive and steering means to provide steering; two transmission output devices, one said device being responsive to each said output shaft means of said first range; and a hydromechanical second range including a mechanical input drive means responsive to said power input means, gear set means and output gear means for transmitting second range output to said two transmission output devices; a speed averaging differential device having two input elements and one output element interposed between said first and second ranges with each said input element being connected to a different said output shaft means of said first range and said output element being connected to said gear set means of said second range for transmitting to said second range, for second range operation, a speed that is the average of the two outputs of said adjustable hydraulic propulsive and steering means whereby steering is accomplished in both ranges by adjustment of said first range propulsive and steering means, the output speed of said transmission in first range is a function of said power input means and said hydraulic propulsive and steering means, and the output speed of said transmission in second range is a function of the output of said first range, said power input means, said gear set means and said transmission output devices.

* * * * *

UNITED STATES PATENT OFFICE
CERTIFICATE OF CORRECTION

Patent No. 3,815,698    Dated June 21, 1974

Inventor(s) Bradley O. Reed

It is certified that error appears in the above-identified patent and that said Letters Patent are hereby corrected as shown below:

Claim 8, column 11, line 11, delete "6" and insert -5-.

Signed and sealed this 17th day of September 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

PATENT NO. : 3,815,698
DATED : June 11, 1974
INVENTOR(S) : Bradley O. Reed

It is certified that error appears in the above-identified patent and that said Letters Patent are hereby corrected as shown below:

On first (title) page of Patent under Item [56], last reference cited, delete "3,650,129" and insert --3,650,159--.

Signed and Sealed this thirtieth Day of August 1977

[SEAL]

Attest:

RUTH C. MASON
*Attesting Officer*

C. MARSHALL DANN
*Commissioner of Patents and Trademarks*